US00RE37510B1

(19) United States
(12) Reissued Patent
Bowman et al.

(10) Patent Number: US RE37,510 E
(45) Date of Reissued Patent: Jan. 15, 2002

(54) SELF-SYNCHRONIZED DRIVE CIRCUIT FOR A SYNCHRONIZED RECTIFIER IN A CLAMPED-MODE POWER CONVERTER

(75) Inventors: Wayne C. Bowman, Allen; Van A. Niemela, Dallas, both of TX (US)

(73) Assignee: Lucent Technologies Inc., Murray Hill, NJ (US)

(21) Appl. No.: 09/244,624

(22) Filed: Dec. 17, 1998

Related U.S. Patent Documents

Reissue of:
(64) Patent No.: 5,590,032
Issued: Dec. 31, 1996
Appl. No.: 08/452,560
Filed: May 25, 1995

(51) Int. Cl.[7] ..... H02M 3/00; H02S 1/00
(52) U.S. Cl. ..... 363/15; 363/127
(58) Field of Search ..... 363/15, 127, 17, 363/18, 21, 131

(56) References Cited

U.S. PATENT DOCUMENTS

| | | | | |
|---|---|---|---|---|
| 3,989,995 A | | 11/1976 | Peterson | 321/2 |
| 4,441,146 A | | 4/1984 | Vinciarelli | 363/20 |
| 4,618,919 A | | 10/1986 | Martin, Jr. | 363/21 |
| 4,716,514 A | * | 12/1987 | Patel | 363/127 |
| 4,788,634 A | | 11/1988 | Schlecht et al. | 363/21 |
| 4,809,148 A | | 2/1989 | Barn | 363/20 |
| 4,857,822 A | * | 8/1989 | Tabisz et al. | 363/16 |
| 4,870,555 A | | 9/1989 | White | 363/21 |
| 4,899,271 A | | 2/1990 | Seiersen | 363/126 |
| 4,903,189 A | | 2/1990 | Ngo et al. | 363/127 |
| 4,931,716 A | | 6/1990 | Jovanovic et al. | 323/285 |
| 4,959,764 A | | 9/1990 | Bassett | 363/16 |
| 4,975,821 A | | 12/1990 | Lethellier | 363/21 |
| 5,066,900 A | | 11/1991 | Bassett | 323/224 |
| 5,099,406 A | | 3/1992 | Harada et al. | 363/20 |
| 5,126,651 A | | 6/1992 | Gauen | 323/222 |
| 5,126,931 A | | 6/1992 | Jitaru | 363/21 |
| 5,179,512 A | | 1/1993 | Fisher et al. | 363/127 |
| 5,231,563 A | | 7/1993 | Jitaru | 363/98 |
| 5,268,830 A | * | 12/1993 | Loftus, Jr. | 363/17 |
| 5,274,543 A | * | 12/1993 | Loftus, Jr. | 363/127 |

(List continued on next page.)

FOREIGN PATENT DOCUMENTS

| | | | |
|---|---|---|---|
| EP | 0 058 400 | 8/1982 | H02M/3/325 |
| EP | 0 289 186 | 11/1988 | H02M/3/337 |
| EP | 0 428 377 A2 | 5/1991 | H02M/3/335 |
| EP | 0 474 471 A2 | 3/1992 | H02M/3/335 |
| EP | 0 508 664 A1 | 10/1992 | H02M/3/337 |
| SU | 892614 | 12/1981 | H02M/3/28 |
| WO | WO 83/02858 | 8/1983 | H02M/1/18 |
| WO | WO 89/08347 | 9/1989 | H02M/3/337 |

OTHER PUBLICATIONS

"A Mosfet Resonant Synchronous Rectifier for High–Frequency DC/DC Converters" by Wojciech A. Tabisz, Fred C. Lee and Dan Y. Chen; 1990 IEEE; pp. 769–779.

(List continued on next page.)

*Primary Examiner*—Peter S. Wong
*Assistant Examiner*—Bao Vu

(57) ABSTRACT

A power converter with a self synchronized synchronous rectifier includes one or two drive windings to provide positive drive to the control electrodes of the controlled switches (FETs) of a self synchronized synchronous rectifier. The polarities of these windings am selected so that the switched devices are driven appropriately to rectify the periodic signal output of the secondary winding of the power transformer of the converter. In some arrangements one or two drive windings are included as extra windings in the power transformer and connected to provide the proper polarity drive signals. The turn ratios of the drive windings to the other windings are selected to provide the proper gate drive signal levels. In an alternative arrangement a separate drive transformer may be provided to supply the gate drive signals.

76 Claims, 10 Drawing Sheets

U.S. PATENT DOCUMENTS

| | | | | | |
|---|---|---|---|---|---|
| 5,282,123 | A | | 1/1994 | Boylan et al. | |
| 5,291,382 | A | | 3/1994 | Cohen | 363/16 |
| 5,303,138 | A | * | 4/1994 | Rozman | 363/21 |
| 5,353,212 | A | * | 10/1994 | Loftus, Jr. | 363/17 |
| 5,434,768 | A | | 7/1995 | Jitaru et al. | 363/21 |
| 5,528,480 | A | | 6/1996 | Kikinis et al. | 363/15 |
| 5,528,482 | A | | 6/1996 | Rozman | 363/21 |
| 5,535,112 | A | | 7/1996 | Lopez et al. | 363/20 |
| 5,541,828 | A | | 7/1996 | Rozman | 363/21 |
| 5,636,116 | A | | 6/1997 | Milavec et al. | 363/89 |

OTHER PUBLICATIONS

"Constant Frequency, Forward Converter with Resonant Transition" by Ionel Dan Jitaru; HFPC; Jun. 1991 Proceedings; pp. 282–293.

"Practical Application of Mosfet Synchronous Rectifiers" by James Blanc; 1991 IEEE; pp. 495–501.

"Study of the Applicability of Self–Driven Synchronous Rectification to Resonant Topologies" by J.A. Cobos, J. Sebastian, J. Uceda, E. de la Cruz, and J.M. Gras; 1992 IEEE; pp. 933–940.

"A Simple and Efficient Synchronous Rectifier for Forward DC–DC Converters" by N. Murakami, H. Namiki, K. Sakakibara and T. Yachi; 1993 IEEE; pp. 463–468.

"5.6 Mosfets Move In On Low Voltage Rectification (TA84–2)" 1984; pp. 5–69—5–86.

"Improving Power Supply Efficiency with Mosfet Synchronous Rectifiers" by Richard S. Kagan and Min–hwa Chi; Power Concepts, Inc. 1982; pp. 1–5.

APEC '92 publication entitled "A New High Frequency, Zero–Voltage Switched, PWM Converter" Ionel Dan Jitaru; 1992 IEEE; pp. 657–664.

"Design Techniques for Transformer Active Reset Circuits at High Frequencies and Power Levels" by Bruce Carsten; HFPC—May 1990 Proceedings; pp. 235–246.

"5.6.1 Using Power MOSFETs as High–Efficiency Synchronous and Bridge Rectifiers in Switch–Mode Power Supplies (TA83–1)"; 1984; pp. 5–87—5–94.

"High Power SMPS Require Intrinsic Reliability" by Bruce Carsten; PCI 1981 Proceedings; pp. 118–133.

"High–Frequency High–Density Converters for Distributed Power Supply Systems" by John G. Kassakian and Martin F. Schlecht; 1988 IEEE; 15 pages.

"Power Mosfet for Switching Regulator" S. Ikeda, Y. Usanaga, H. Yoshida; 1982 IEEE; pp. 212–215.

"High Power and High Switching Frequency DC–to–DC Converter Using Saturable Inductor Commutation and Swirched Snubber" by Koosuke Harada and Hiroshi Sakamoto; 1991 IEEE; pp. 148–154.

"Principles of Solid–State Power Conversion" by Ralph E. Tarter; 1985; pp. 544–547.

"Buck Quasi–Resonant Converter Operating at Constant Frequency; Analysis, Design and Experimentation" by Ivo Barbi, J.C. Bolacell, D.C. Martins, F.B. Libano; 1989 IEEE; pp. 873–880.

"High Efficiency DC–DC Converter" by Ionel Dan Jitaru and George Cocina; 1994 IEEE; pp. 638–644.

"Design of a High–Efficiency Power Converter for a Satellite Solid–State Power Amplifier" by L. Huber, D. Sable, G. Hua, F.C. Lee, and N. LaPrade; 1994 IEEE; pp. 645–651.

"Resonant Reset Forward Topologies for Low Output Voltage On Board Converters" by J. A. Cobos, O. Garcia, J. Sebastian, J. Uceda; 1994 IEEE; pp. 703–708.

"A Highly Efficient, Low–profile 300–W Power Pack for Telecommunications Systems" by N. Murakami, I. Yumoto, T. Yachi and K. Maki; 1994 IEEE; pp. 786–792.

"High Power SMPS Require Intrinsic Reliability" by Bruce Carsten; Mar. 1982; pp. 456–472.

Alexander, M., Blanchard, R., Severns, R., "MOSFETs Move in on Low Voltage Rectification", Mospower Applications Handbook, Siliconix Technical Article, 1982, Siliconix, Inc.

Jitaru, L., Dan and Cocian, George, "High Efficiency DC–DC converter", Conference Proceeding of the 9th Annual Applied Power Electronics Converence and Exposition, p. 639, vol. 2.

* cited by examiner

SELF-SYNCHRONIZED DRIVE CIRCUIT FOR A SYNCHRONIZED RECTIFIER IN A CLAMPED-MODE POWER CONVERTER

Matter enclosed in heavy brackets [ ] appears in the original patent but forms no part of this reissue specification; matter printed in italics indicates the additions made by reissue.

FIELD OF THE INVENTION

This invention relates to synchronous rectification and to a power converter employing synchronous rectification. It is particularly concerned with a self synchronized rectifier combined with a converter.

BACKGROUND OF THE INVENTION

A converter is a power processing circuit, that may have an input-output transformer isolation, that operates to convert an input voltage waveform with a DC component into an output DC voltage waveform. The presence of an isolation transformer requires the use of a rectifier circuit in the converter output circuit to perform the waveform conversion. The traditional rectifier uses rectifying diodes that conduct the load current only when forward biased in response to the input waveform. In some rectifiers (i.e. synchronous rectifiers) the diodes are replaced by controlled switches that are periodically biased into conduction and nonconduction in synchronism with the periodic waveform to be rectified. In self-synchronized synchronous rectifiers the biasing of the synchronous switches is supplied directly from a secondary winding of a transformer without requiring a separate drive to activate the synchronous switches.

Self-synchronized synchronous rectifiers come in many forms, all designed to meet specified operating constraints. The challenge, in each instance, is to devise synchronous rectifier circuitry that is efficient (i.e. has low power dissipation) in performing the rectification process. The specific circuit topology of the synchronous rectifier is dependent in large part on the converter type being used and its operating characteristics (i.e. hard switched rs. soft switched). Application of self synchronized synchronous rectifiers to hard switched buck derived converter topologies, for example, is limited by a variable transformer reset voltage that often causes the voltage across the transformer windings to be essentially zero during a portion of each switching cycle. During this time, the synchronous rectifier switch that should be conducting is operating in a dissipative or cut-off mode causing a serious shortfall in efficiency. An example of a circuit that eliminates the problem of zero voltage across the transformer is provided in the U.S. Pat. No. 5,303,138 which discloses an improved forward converter combined with a self synchronized synchronous rectifier. In this circuit the reset voltage is clamped and maintained over the non conducting interval of the main power switch and hence causes the rectifier to operate over the entire non conducting interval. In this arrangement the gate drive signal is directly dependent upon the voltage of the secondary winding which in turn is dependent upon the input voltage and load. In practice the voltages of the secondary winding may vary over a substantial range and there is the possibility of insufficient drive voltage for a rectifier that is conducting, causing it to operate in either a dissipative mode or a cut-off mode. This deficiency is quite likely for converters that deliver low output voltages.

In a circuit disclosed by L. Hubler et al (APEC 94 page 645, entitled "Design of a High Efficiency Power Converter For a Satellite Solid-State Power Amplifier"), the problem of insufficient drive voltage is overcome by including separate windings on the power transformer to drive the synchronous rectifier switches. However, when the turns of the drive windings are set high enough to ensure adequate drive voltage for all operating conditions of input voltage and load, excessive drive voltage is typically generated at some operating condition. This causes excessive power dissipation or failure of the synchronous rectifier switch.

In another U.S. Pat. No. 5,274,543 voltage limiting (gate drive) switches are disclosed as a means for limiting dissipation in the drive circuit for the synchronous rectifiers.

SUMMARY OF THE INVENTION

A power converter with a self-synchronized rectifier that includes one or two drive windings that do not carry load current but instead drive the control electrode(s) of one or both controlled rectifier switches (FETs). The drive winding (s) are connected in such a way that the switched devices rectify the periodic voltage waveform present at the secondary winding of the power transformer of the converter, with the turns of the drive winding(s) selected to provide sufficient drive signal levels under all operating conditions of input voltage and load. Additional switches may be connected in series with the control electrodes of the rectifier switches to limit the applied voltage. This drive circuit ensures that the drive voltage is always large enough to bias the proper synchronous-rectifier switch conducting, but not so large that it damages the switch or dissipates excessive power.

In one arrangement of the drive circuit, an extra winding is included in the power transformer, and each of its leads is connected to the control electrode of one synchronous-rectifier switch. In another arrangement, a separate drive transformer is provided to supply the gate drive signals. In either of these arrangements, there may be voltage-limiting switches connected between the drive winding and the control electrode of each synchronous-rectifier switch.

In a third arrangement, one or two extra windings are included in die power transformer and for each one, one lead is connected to the secondary winding and the other is connected to a voltage-limiting switch, of a series connection of two voltage limiting switches which is connected to the control electrode of a synchronous-rectifier switch.

DETAILED DESCRIPTION

Figure 1:
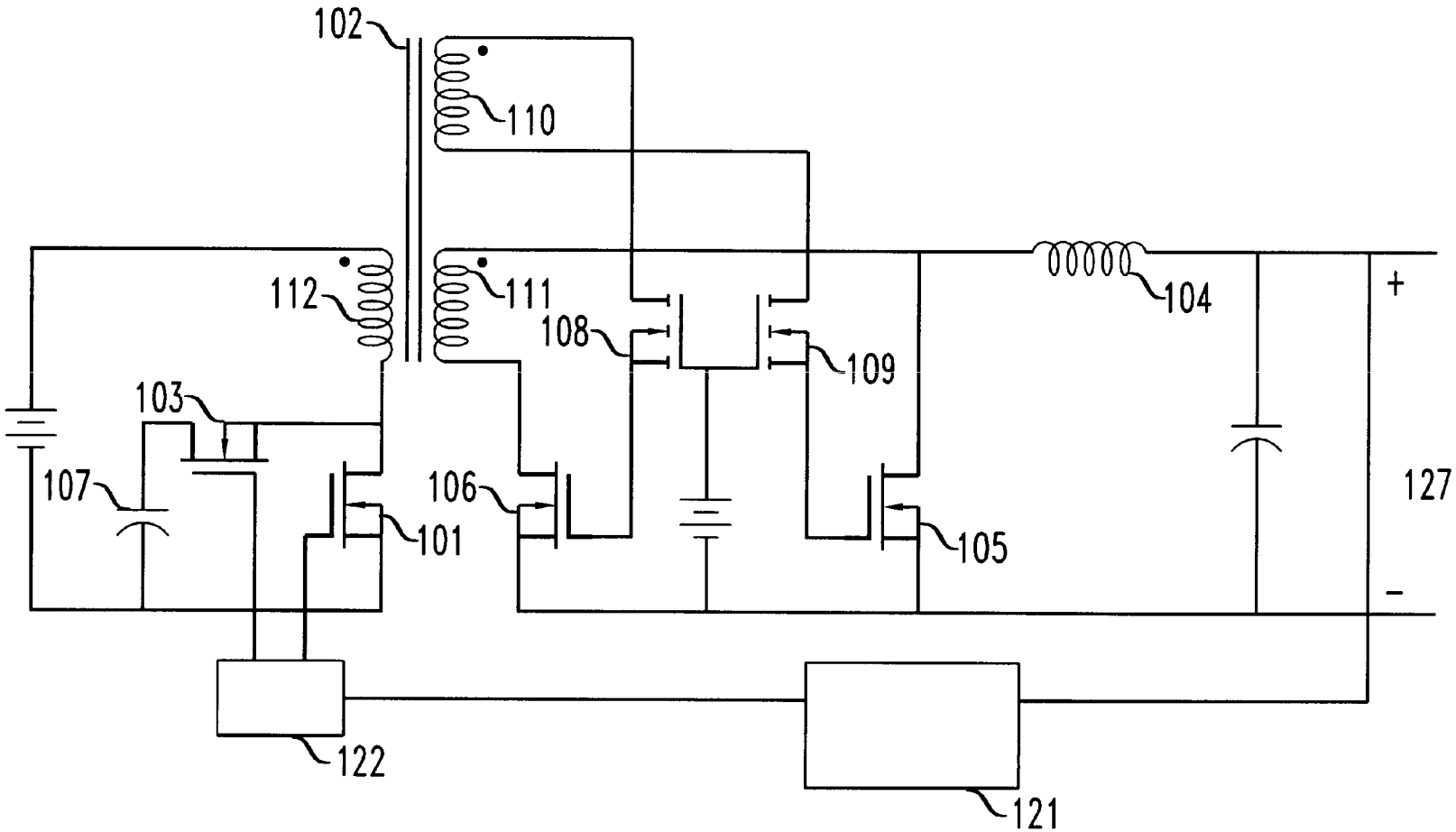
FIG. 1 is a schematic of a clamped forward converter with a drive for a self synchronized synchronous rectifier.

A power converter, such as shown in FIG. 1, includes a main FET power switch 101 connected to and periodically switched to enable an input DC voltage to be applied to the primary winding 112 of the power transformer 102. An auxiliary switch 103 and a capacitor 107 connected in series and placed in shunt connection with the power switch 101 operates to clamp the voltage level across the primary and secondary windings during non conducting intervals of the power switch 101. This assures that a voltage exists at the transformer windings over the entire time of non-conduction of the main power switch to assure drive for synchronous rectifier devices connected in the secondary circuit. The secondary winding 111 is connected to two rectifier switches 105 and 106 which are controllably switched to rectify the periodic waveform supplied to the rectifier by the secondary winding 111. A low pass filter including inductor 104 acts on the rectified waveform to supply the output voltage $V_{out}$, A regulation control 121 senses the output voltage $V_{out}$, via lead 127, and controls the duty cycle of the main power switch 101 and auxiliary switch 103, via the drive circuit 122.

The power transformer 102 includes a third or auxiliary winding 110 having a winding polarity so that its voltage is utilized to appropriately drive the FET synchronous rectifier switches 105 and 106. Drive to the FET synchronous rectifier switches 105 and 106 is applied through the drain-source path of the gate drive FET devices 109 and 108 respectively. The drive level is determined by the turn ratio of the auxiliary winding 110 with respect to the primary winding 112, selected to assure that there is sufficient drive for the gates of synchronous rectifier switches 105 and 106 over the entire operating cycle and permitted range of input voltage $V_{in}$. The FET devices 108 and 109 limit the voltage applied to the gates of the synchronous rectifier switches 105 and 106 to reduce dissipative losses and to reduce the possibility of voltage overstress of the switches 105 and 106. A voltage source $V_b$ is used to supply a bias voltage to the FET devices 108 and 109.

Figure 2:
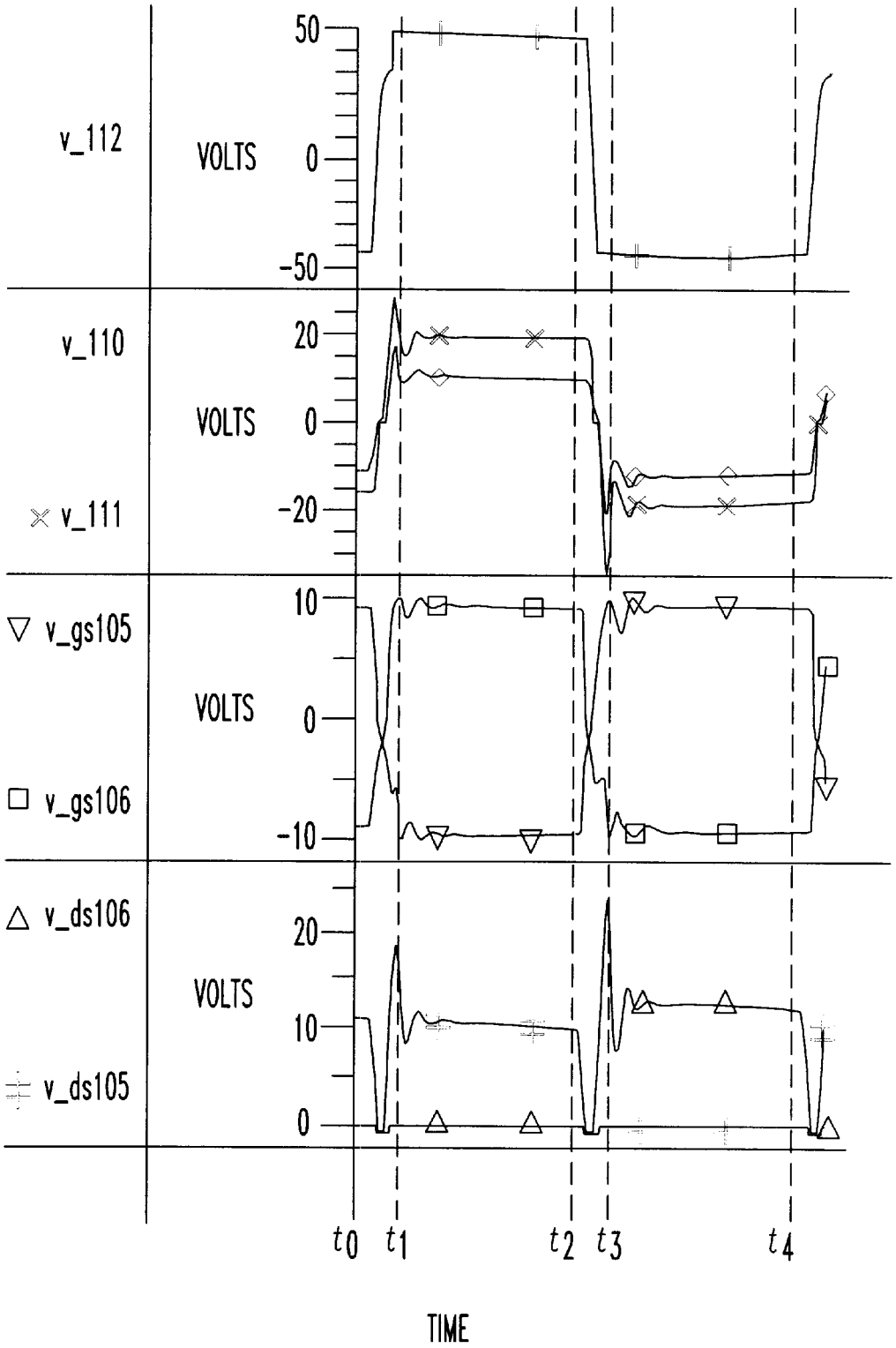
FIG. 2 is a graph of waveforms to assist in describing the operation of the converter of FIG. 1.

The operation of the converter may be readily understood through the following description and by reference to the voltage waveforms shown in the FIG. 2. At the initial $t=t_0$ start time the power switch 101 is non-conducting and the auxiliary switch 103 is conducting with substantially zero impedance in its main conductive path. Switch 103 is then turned off, and before time $t=t_1$ switch 101 is turned on, causing the input voltage $V_{in}$ to be fully impressed across the primary winding 111 of transformer 102. The voltages $v_{111}$ across winding 111 and $v_{110}$ across winding 110 (dotted ends are positive with respect to undotted ends) are determined by the respective turn ratios. Typically more turns am included in winding 110 to boost the synchronous-rectifier drive voltage above that available at winding 111. As the voltage $v_{110}$ increases, current flows out of the dotted terminal of the winding 110 through the switch 108 to the gate capacitance of the rectifying switch 106 causing the gate-source voltage $v_{gs106}$ of switch 106 to increase. This voltage continues to increase until the gate-source voltage of the switch 108 falls below the sustaining threshold and the switch 108 becomes non-conducting at time $t=t_1$ Non-conductance of switch 108 clamps the voltage at the gate of switch 106 to a value determined by the difference between the DC bias voltage $V_b$ connected to the gate of switch 108 and the threshold voltage of the switch 109.

Current now has stopped flowing into the gate of switch 106, supplied by the secondary winding 110. The same current flowed out of the gate of switch 105 and impressed a negative voltage $v_{gs105}$ across the gate to source junction of switch 105, causing it to turn off to a non-conducting state. The load current now flows through switch 106, secondary winding 111 and output inductor 104.

Between times $t=t_2$ and $t=t_3$, the switches 101 and 103 change state, after which switch 101 is non-conducting and switch 103 is conducting. For a short period during this interval, the drain-source channel of neither switch 105 or 106 is conducting and the output inductor current is conducted through the body diodes comprising a part of the switch of these devices. A negative voltage $V_{in}$ minus $V_{c107}$ is impressed across the primary winding 111 of transformer 102 causing the voltage across the secondary winding 111 and auxiliary winding 110 to reverse.

Initially, at the start of this interval, switch 108 is non-conducting and switch 109 is conducting. The negative voltage $V_{110}$ across winding 110 causes the gate to source capacitance of switch 106 to discharge through the body diode of switch 108. The gate to source capacitance of switch 105 is charged and the enabled switch 105 and output inductor 104 carry the load current. At time $t=t_a$, the steady-state operating cycle that began at $t=t_0$, repeats itself.

Circuit resonances are produced by the switching in the circuit due to the interaction between parasitic capacitances and inductances of the circuit. These resonances cause tinging in the drain-to-source voltage waveforms of switches 105 and 106 and as shown by the waveforms of FIG. 2 as they change conductive states. Coupling of these tinging voltages, through the parasitic drain-to-gate capacitances of switches 105 and 106 could cause them to inappropriately conduct, however the bias circuit arrangement described herein causes negating voltages to be clamped across the gate to source terminals of switches 105 and 106 when they are normally non-conducting. Hence temporary voltage increases can not inadvertently turn on these devices and cause turn on losses that impair circuit efficiency.

Figure 3:
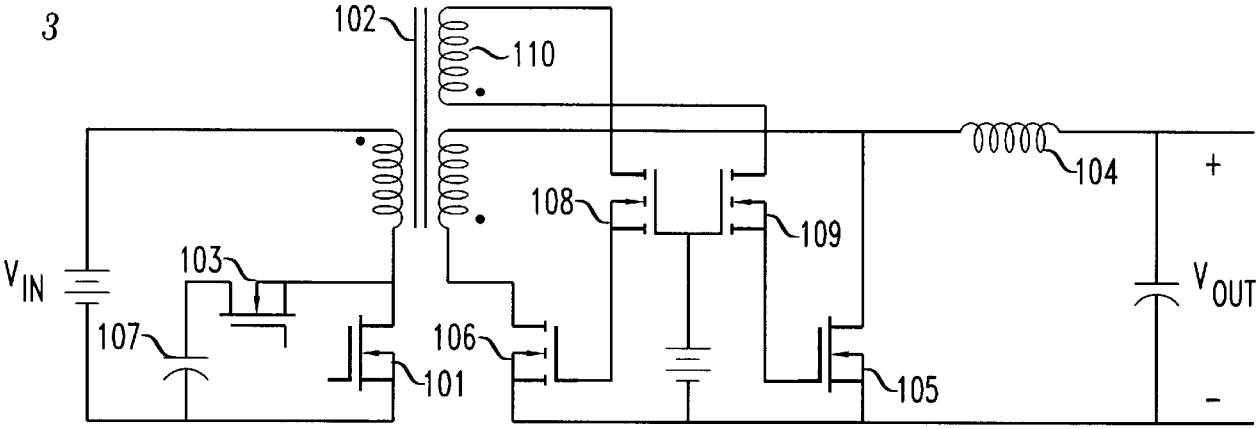
FIG. 3 through 14 are schematics of other versions of a self synchronized synchronous rectifier, embodying the principles of the invention.
Figure 4:
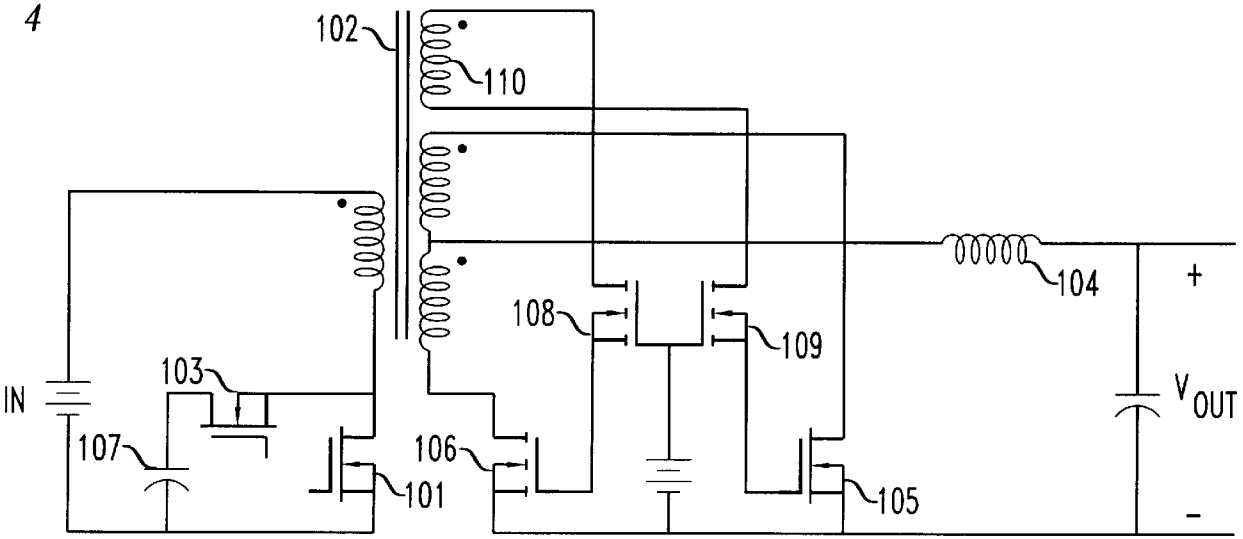

Many variations of the circuit of FIG. 1 operate in the same manner without departing from the spirit and scope of the invention. The circuit of FIG. 3 discloses a flyback converter having a drive winding on the power transformer. In the circuit of FIG. 4 the output filter is connected to a tap in the power secondary winding to achieve both forward and flyback mode operation.

Figure 5:
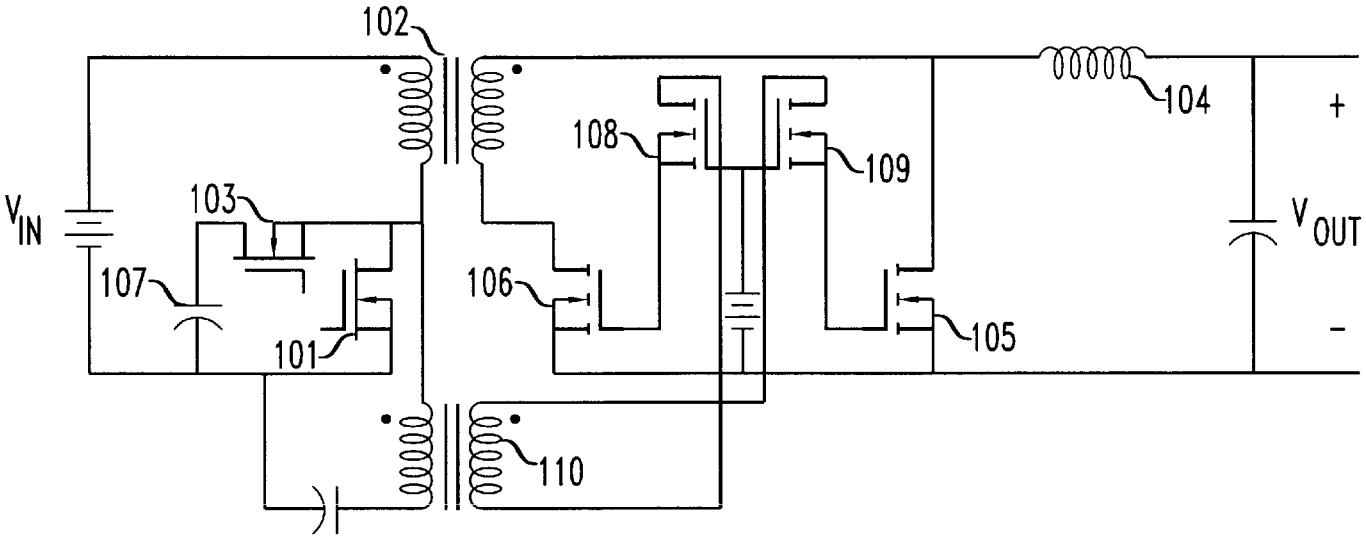
Figure 6:
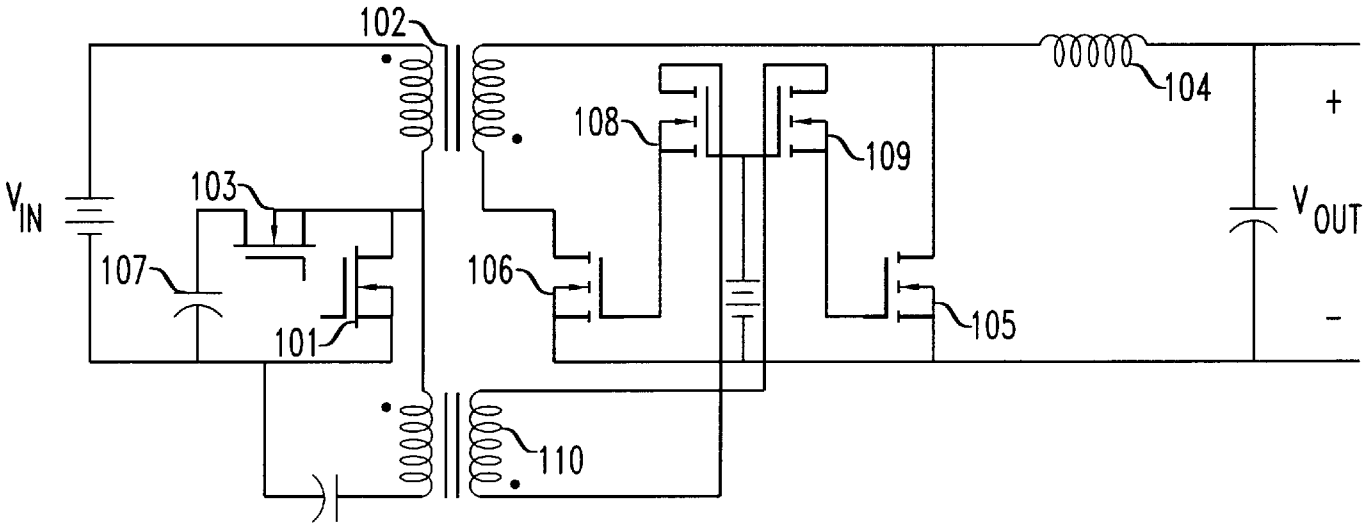
Figure 7:
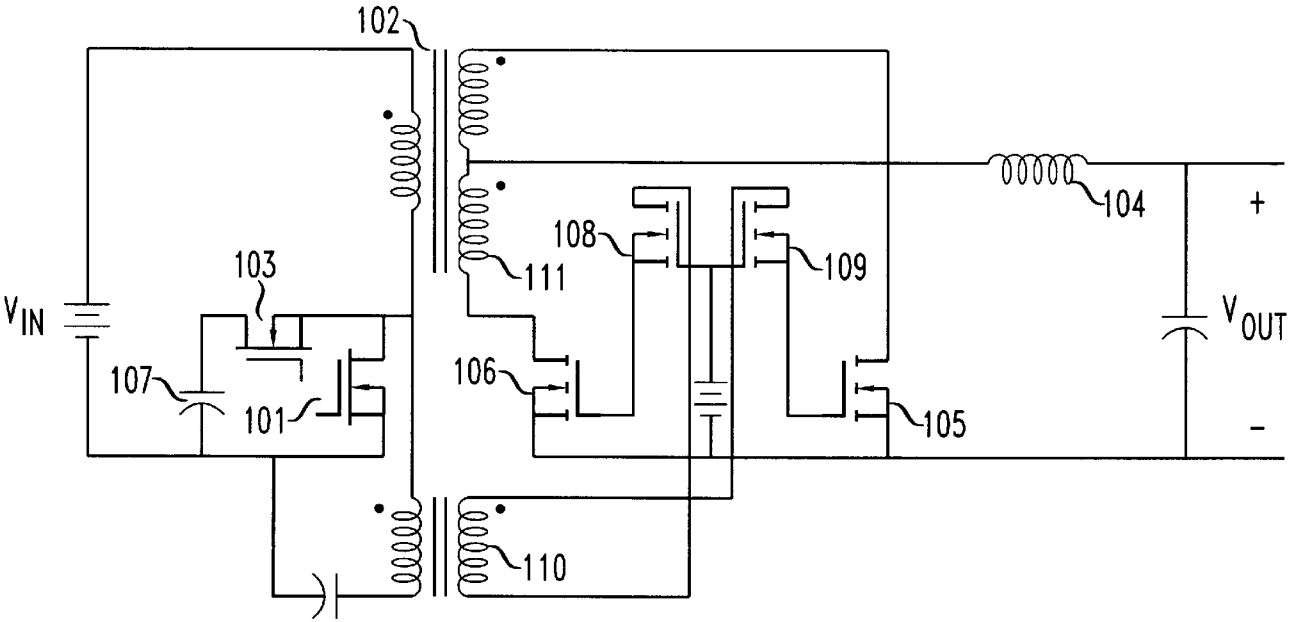
Figure 8:
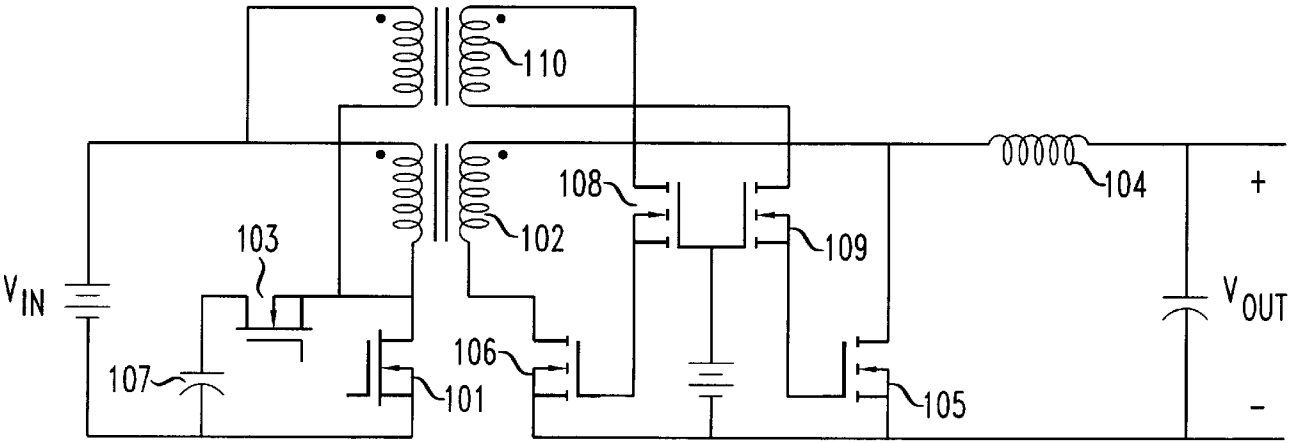
Figure 9:
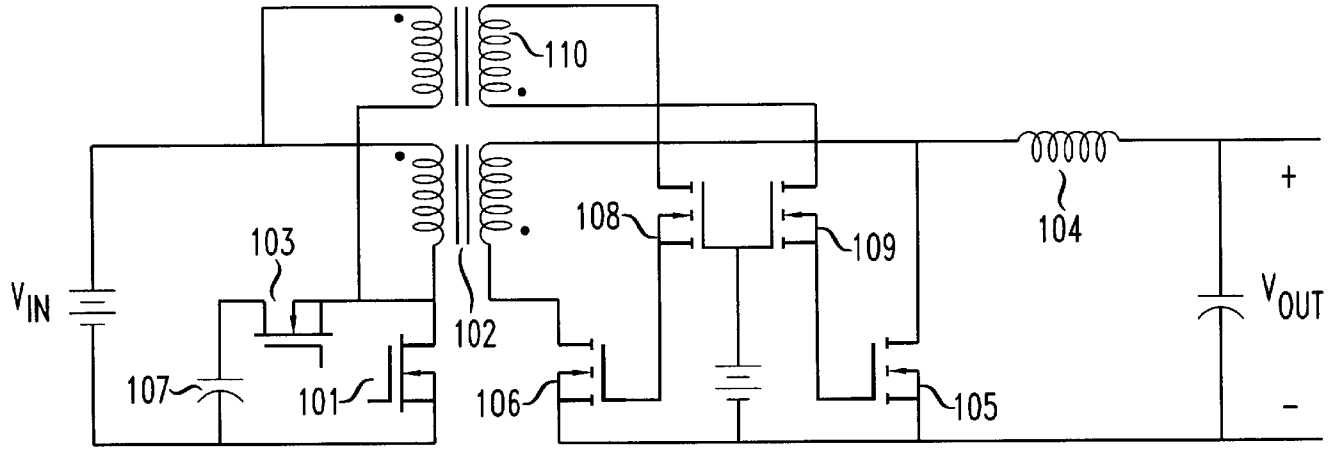
Figure 10:
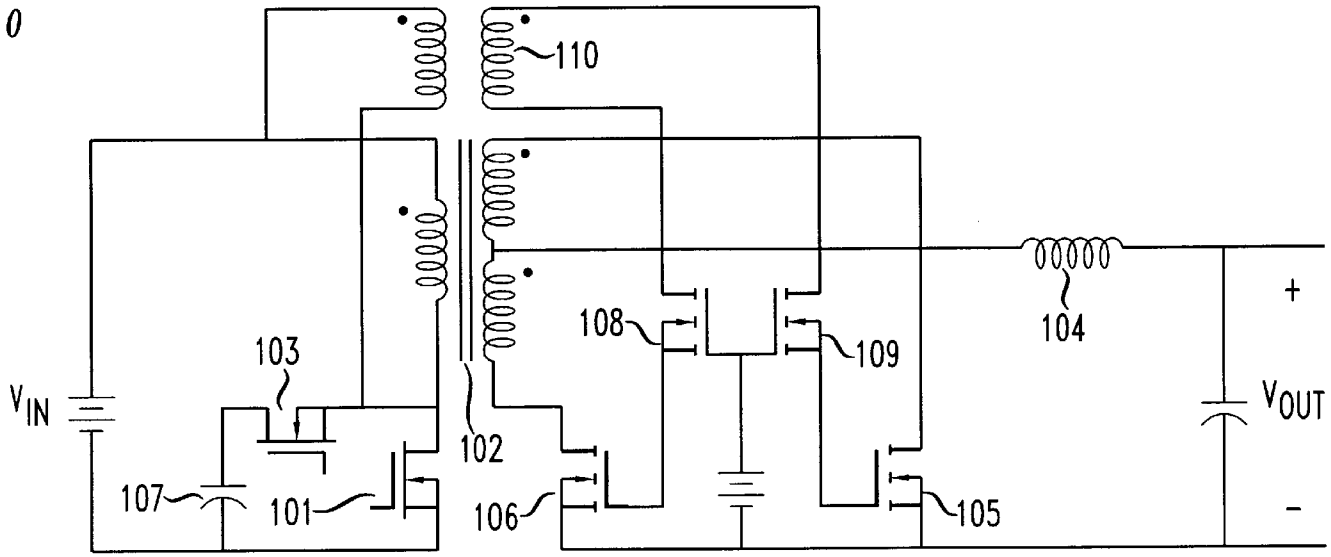

In the circuit variations of FIGS. 5 through 10, the drive winding for the synchronous rectifiers is contained in a separate drive transformer rather than the power transformer 102. In FIGS. 5 through 7, the primary winding of the drive transformer 110 and a series connected capacitor (to block DC current) are connected across the power switch 101. This drive circuit is shown in a forward converter in FIG. 5, a flyback converter in FIG. 6, and a converter with a tapped secondary winding in FIG. 7. In FIGS. 8 through 10, the drive transformer and capacitor are connected instead across a winding of the power transformer 102. This drive configuration is shown for the same three basic converters, a forward converter in FIG. 8, a flyback converter in FIG. 9, and a converter with a tapped secondary winding in FIG. 10.

Figure 11:
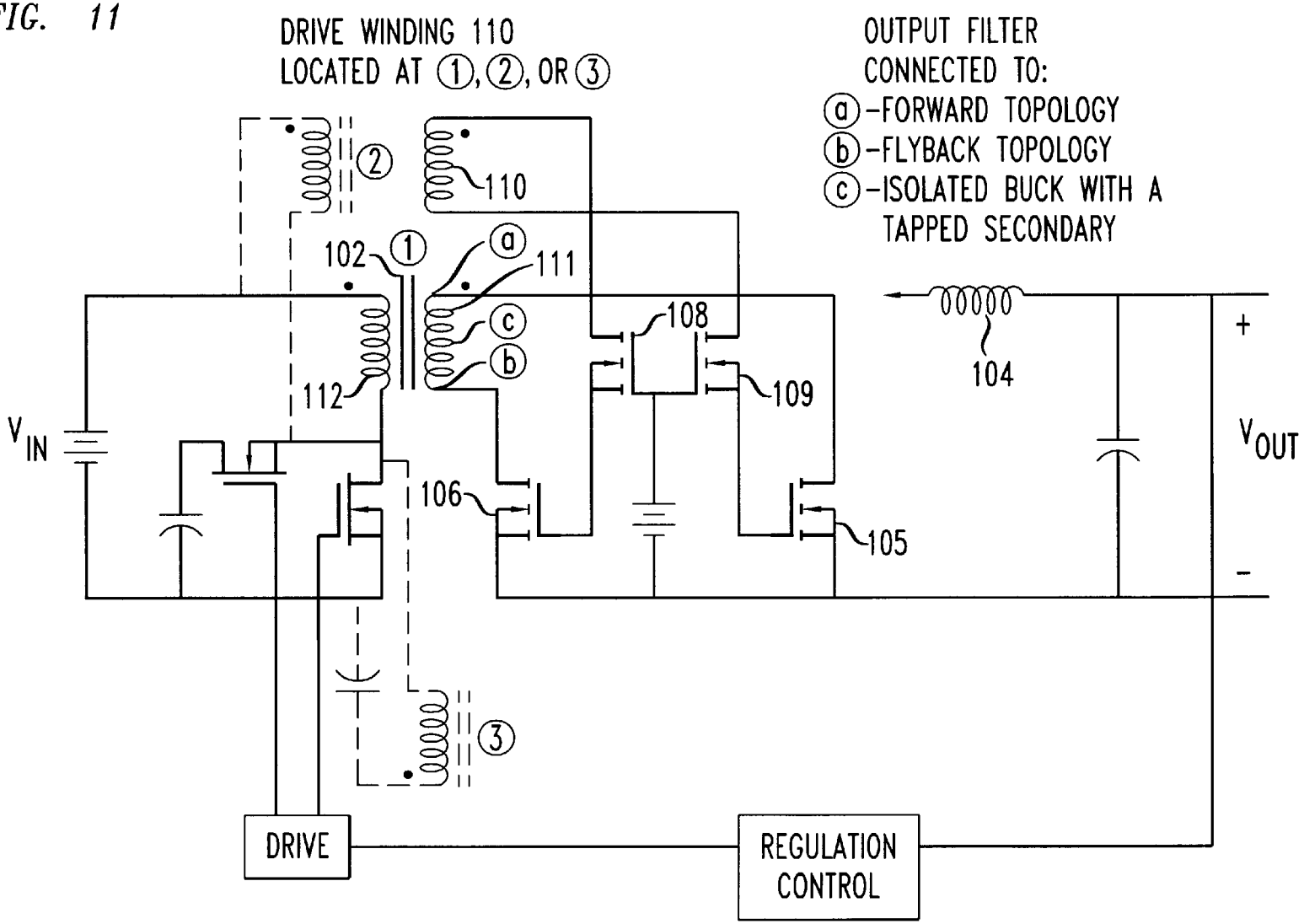
Figure 12:
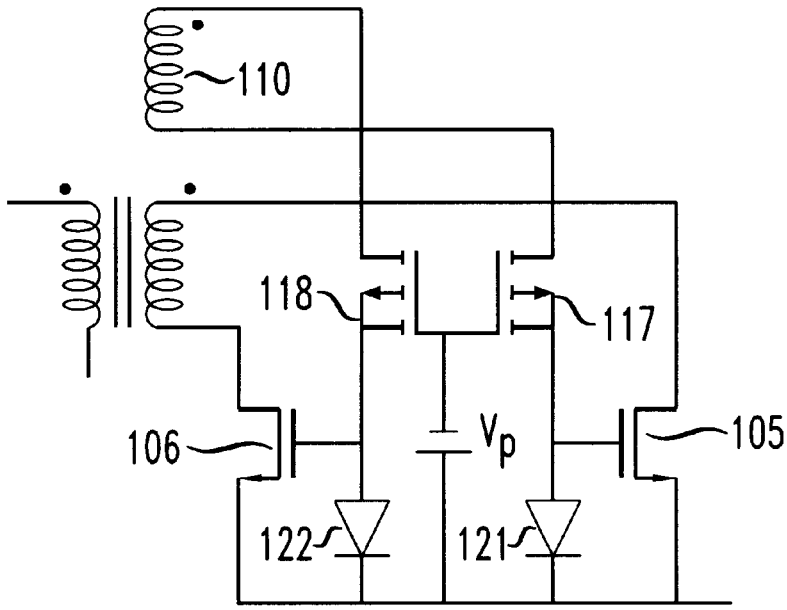
Figure 13:
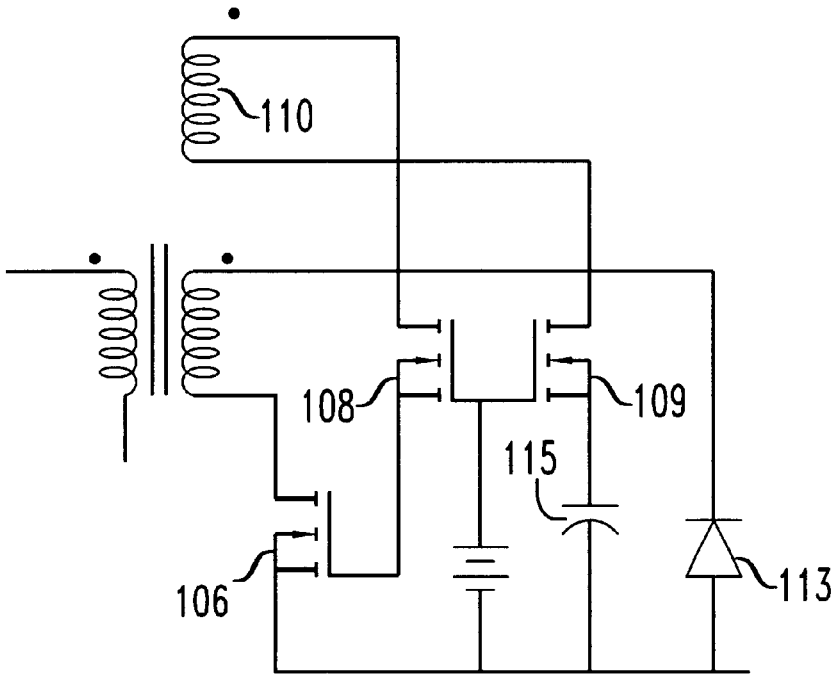
Figure 14:
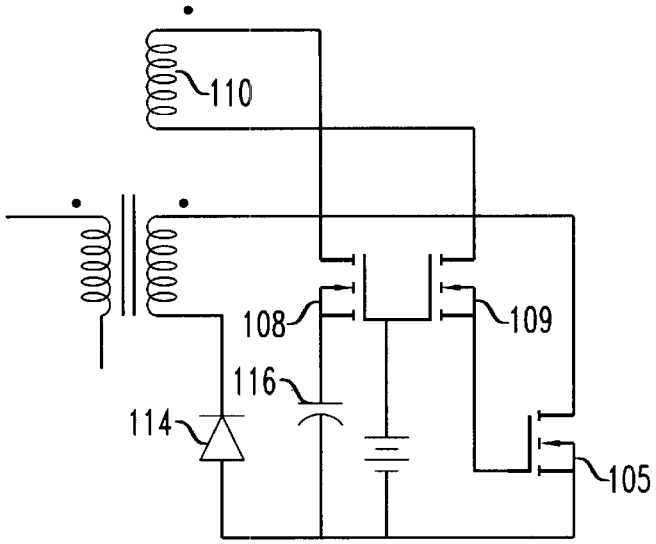

FIG. 11 is a schematic diagram that represents all nine of the aforementioned circuit variations; i.e., all combinations of three circuit topologies and three possible locations of the synchronous-rectifier drive winding. FIGS. 12 through 14 show part of the circuit of FIG. 11, to illustrate some further circuit variations that embody the principles of the invention and can be applied to any of the nine aforementioned circuits.

The drive circuit in FIG. 12 accomplishes the same action as that in FIG. 11, but for a different kind of synchronous rectifier switch. This switch is biased conducting when the gate-to-source voltage is zero or positive, and it is biased nonconducting by a negative gate-to-source voltage. Diodes 121 and 122, which may be intrinsic to synchronous-rectifier switches 105 and 106, limit the positive voltage applied to the gate electrodes of the switches. Switches 117 and 118, along with the voltage source $V_p$, limit the negative voltage applied to the gate electrodes of 105 and 106. In the embodiment shown in FIG. 12, FETs 117 and 118 are p-channel enhancement-mode FETs, which turn on when the gate-to-source voltage is less than the negative threshold voltage of the device. These switches also contain intrinsic body diodes that conduct to permit turning on the corresponding synchronous-rectifier switch.

During turn-on of synchronous-rectifier switch 106, in FIG. 12, current flows out of the dotted terminal of winding 110, through the body diode of switch 118, and charges the gate capacitance of 106. The gate-to-source voltage of 106 rises to a positive value, clamped by the forward drop of diode 122, turning switch 106 on. Simultaneously, switch 105 is turned off by current flowing out of the gate capacitance of 105 through switch 117. When the source voltage of switch 117 falls to $V_p$ minus the negative threshold voltage of 117, switch 117 turns off, clamping the gate-to-source voltage of switch 105 to a negative value within the limits of the device. During the other switching transition, when synchronous-rectifier switch 106 turns off, the roles of 106, 118, and 122 are exchanged with those of 105, 117, and 121.

FIGS. 13 and 14 show other variations on the circuit of FIG. 11, with either synchronous-rectifier switch replaced by A diode. Specifically, synchronous-rectifier switch 105 in FIG. 11 can be replaced by diode 113 in FIG. 13, with capacitor 115 substituted for the gate-to-source capacitance of switch 105. Alternatively, synchronous-rectifier switch 106 in FIG. 11 can be replaced by diode 114 in FIG. 14, with capacitor 116 substituted for the gate-to-source capacitance of switch 106. These circuits operate in essentially the same manner as described previously for FIG. 1, except that a diode is conducting during one portion of the switching cycle instead of a synchronous-rectifier switch.

Figure 15:
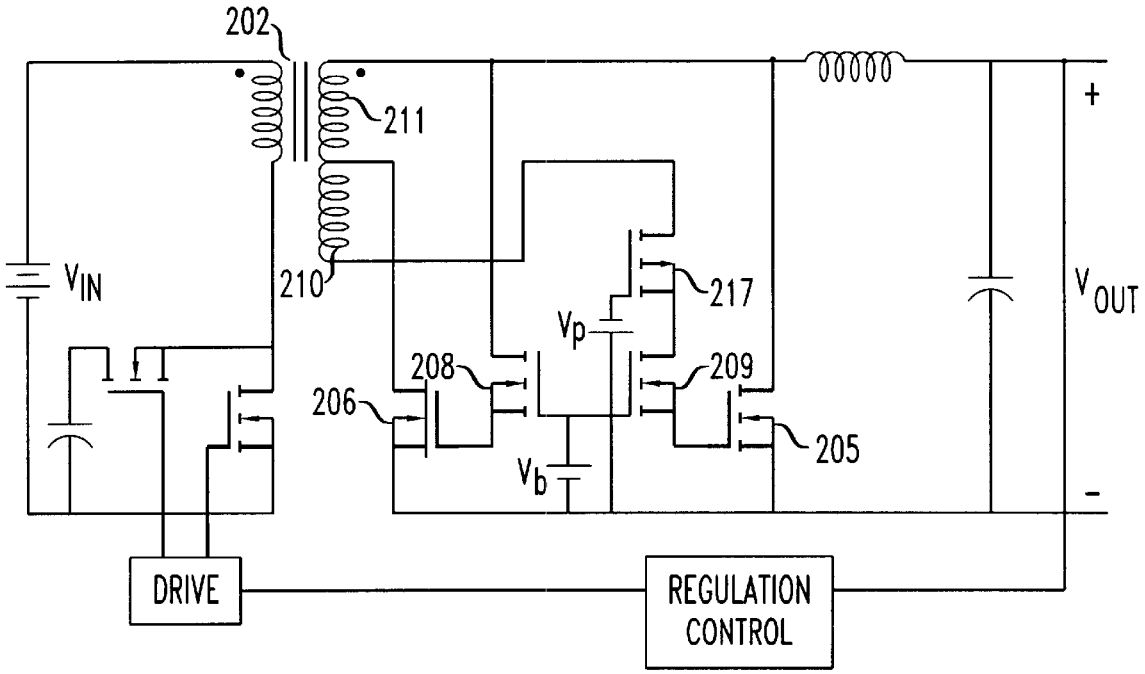
FIG. 15 is a clamped forward converter with an alternate drive for a self-synchronized synchronous rectifier.

Another means of boosting the drive voltage for self-driven synchronous rectifiers is illustrated in FIG. 15. In this example, the voltage available at the secondary power winding 211 is sufficient to drive one of the two synchronous-rectifier switches, 206, but not to drive the other, switch 205. The solution is to add drive winding 210 to the main power transformer 202, with one lead connected to the secondary power winding 211 and the other lead connected in series with one or two voltage-limiting switches and the control electrode of synchronous-rectifier switch 205. Gate-drive switches 209 and 209 are included as in FIG. 1 to limit the positive voltage applied to the gates of the synchronous rectifier switches, New gate-drive switch 217 and new bias voltage $V_p$ are included to limit the "off" voltage applied to the gate of switch 205 during the time synchronous rectifier switch 206 is conducting. During turn-on of switch 205, gate-drive current can flow through the body diode of p-channel FET 217, but during turn-off, gate-drive current flows through the channel of switch 217 until its source voltage (between switches 209 and 217) falls to less than $-V_p$ minus the negative threshold voltage of switch 217. This action protects the gate of synchronous-rectifier switch 205 from excessive negative voltage.

Figure 16:
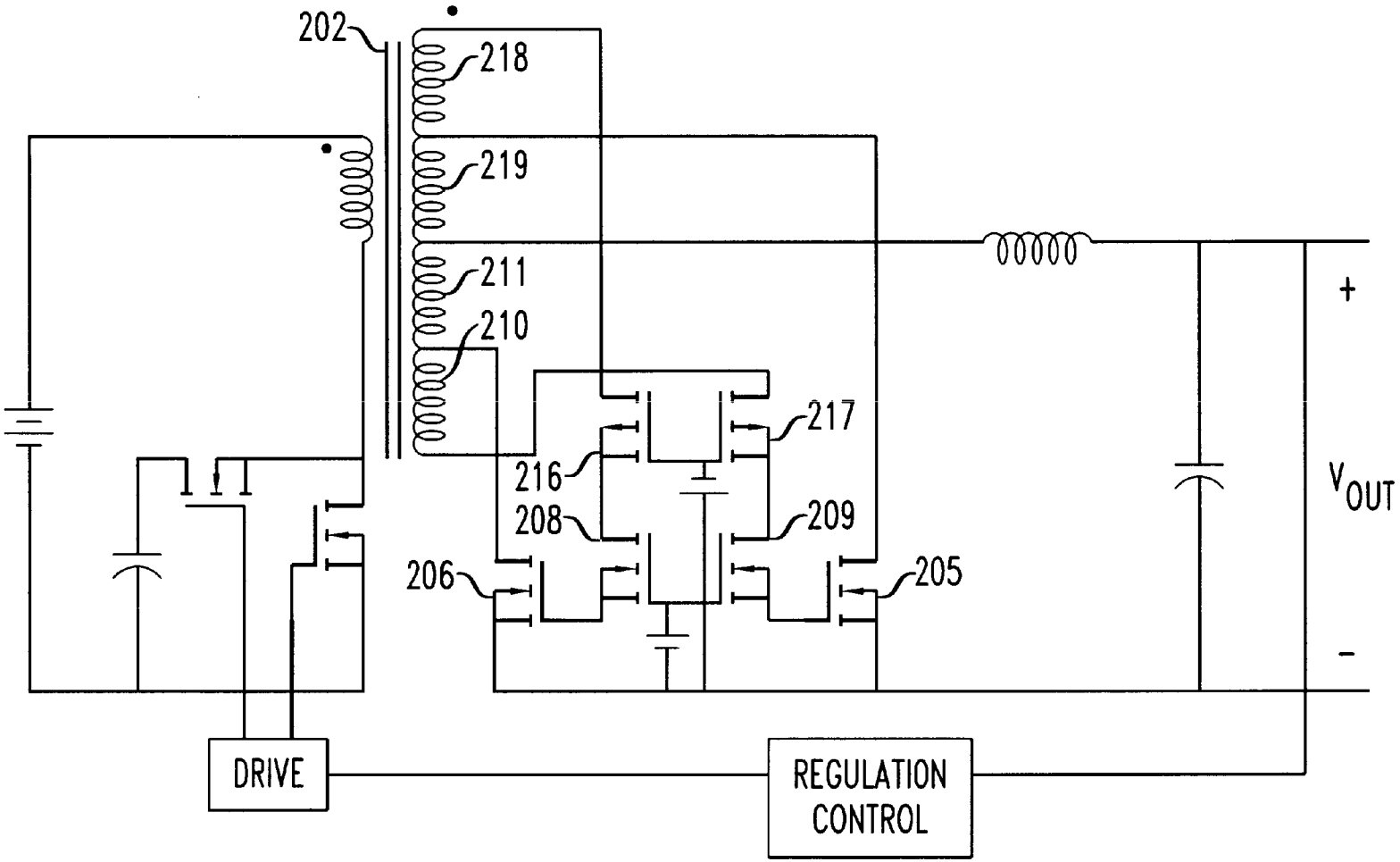
FIG. 16 is a generalized circuit diagram embodying the principles introduced in FIG. 15.

FIG. 16 is a generalized diagram of the invention illustrated in FIG. 15, and a circuit suitable for the alternate type of synchronous-rectifier switch introduced in FIG. 12. Both portions 211 and 219 of the power secondary winding may be present, yielding an isolated buck converter with a tapped secondary winding, or the turns of winding 219 may be set to zero, yielding a forward converter as in FIG. IS, or the turns of winding 211 may be set to zero, giving a flyback converter. Independently, the turns of either drive winding 210 or 218 may be set to zero if sufficient drive voltage is present for a particular design and range of operating conditions. Either of switches 209 and 216 may be eliminated, and either of switches 209 and 217 may be eliminated, as long as the associated gate voltage is not excessive. Finally, either synchronous-rectifier switch 205 or 206 may be replaced by a diode, if desired. Any of these circuit variations embodies the principles of the invention.

The invention claimed is:

1. A DC to DC power converter comprising:

a power transformer having a primary winding and a secondary winding;

a primary circuit for connecting an input DC voltage to the primary winding and including a power switch periodically biased conducting for connecting the input DC voltage to the primary winding and drawing power from the input DC voltage during its conduction and a clamping circuit connected to the primary winding and including energy storage means for sustaining a voltage across the primary winding during an interval when the power switch is biased non-conducting;

a *separate* drive winding magnetically coupled to receive energy from a primary side of the DC to DC power converter;

a secondary circuit connected to receive electrical energy from the secondary winding and for coupling the energy to an output;

the secondary circuit including;

a low pass output filter connected to the output and a synchronous rectifier circuit connecting the secondary winding to the low pass output filter;

wherein the synchronous rectifier circuit comprises:

first and second synchronous rectifier switches each controlled by a signal applied to an included control electrode of the switch;

first and second voltage limiting switches connected in series with the included control electrodes of the first and second synchronous rectifier switches such that the voltage limiting switches limit the amount of voltage supplied from the drive winding to the included control electrodes of the first and second synchronous rectifier switches;

means for establishing a DC potential on gate electrodes of the first and second gate switches; and the drive winding being connected to power path electrodes of the first and second gate switches and connected to alternatively energize the included gates of the first and second synchronous rectifier switches through the first and second gate switches.

2. A DC to DC power converter, comprising:

a power transformer having a primary winding and a secondary winding;

a primary circuit for connecting an input DC voltage to the primary winding and including, a power switch and a clamping circuit for sustaining a voltage in the secondary winding during non-conduction of the power switch;

a secondary circuit for coupling energy transfer from the secondary winding to an output and including, a low pass output filter connected to the output and a synchronous rectifier connecting the secondary winding to the low pass output filter; and the synchronous rectifier including;

first and second synchronous rectifier switches each controlled by a signal applied to an included control electrode, first and second voltage limit switch devices connected to limit a voltage of drive signals applied to the first and second synchronous rectifier switches and [an] *a separate* drive winding connected to alternatively energize the first and second synchronous rectifier switches.

3. A DC to DC power converter, comprising:

a power transformer having a primary winding and a secondary winding;

a primary circuit for connecting an input DC voltage to the primary winding and including, a power switch and a circuit that reverses the polarity of the secondary voltage during a portion of the period of non-conduction of the power switch sufficient to ensure the reset of the transformer magnetic core;

a secondary circuit for coupling energy transfer from the secondary winding to an output and including, a low pass output filter connected to the output and a synchronous rectifier connecting the secondary winding to the low pass output filter;

the synchronous rectifier including;

first and second synchronous rectifier switches each controlled by a signal applied to an included control electrode, first and second voltage limit switch devices connected to limit a voltage of drive signals applied to the first and second synchronous rectifier switches and a *separate* drive winding connected to alternately energize the first and second synchronous rectifier switches.

4. A DC to DC power converter as claimed in claim 1, 2 or 3 comprising:

the primary and secondary circuits being magnetically coupled and including power circuitry to operate as a forward converter; and the drive winding being wound on the power transformer.

5. A DC to DC power converter as claimed in claim 1, 2 or 3 comprising:

the primary and secondary circuits being magnetically coupled and including power circuitry to operate as a flyback converter;

and the drive winding being wound on the power transformer.

6. A DC to DC power converter as claimed in claim 1, 2 or 3 comprising:

the power transformer includes a tapped secondary winding; and the drive winding is wound on a core of the power transformer.

7. A DC to DC power converter as claimed in claim 1, 2 or 3 comprising:

the primary and secondary circuits being magnetically coupled and including power circuitry to operate as a forward converter;

a second transformer magnetically coupling the primary circuit and the secondary circuit and the drive winding being wound on the second transformer.

8. A DC to DC power converter as claimed in claim 1, 2 or 3 comprising:

the primary and secondary circuits being magnetically coupled and including power circuitry to operate as a flyback converter;

a second transformer magnetically coupling the primary circuit and the secondary circuit and the drive winding being wound on the second transformer.

9. A DC to DC power converter as claimed in claim 1, 2, or 3 comprising:

the power transformer includes a tapped secondary winding; and a second transformer Magnetically coupling the primary circuit and the secondary circuit and the drive winding being wound on the second transformer.

10. A DC to DC power converter as claimed in claim 1, 2 or 3 comprising:

a second drive transformer is included for accepting the drive winding and is connected in a circuit in parallel with the power switch; and the primary and secondary circuits being magnetically coupled and including power circuitry to operate as a forward converter.

11. A DC to DC power converter as claimed in claim 1, 2 or 3 comprising:

a second drive transformer is included for accepting the drive winding and is connected in parallel with the power switch; and the primary and secondary circuits being magnetically coupled and including power circuitry to operate as a flyback converter.

12. A DC to DC power converter as claimed in claim 1, 2 or 3 comprising:

the low pass output filter including a filter inductor in series with the output and the power transformer having a tapped secondary winding connected to the low pass output filter; and a second transformer including a primary winding connected in parallel with the power switch and the secondary winding connected to drive the first and second voltage limit switches, exclusively electromagnetically coupled to the primary winding.

13. A DC to DC power converter as claimed in claim 1, 2 or 3 comprising:

a second drive transformer is included for accepting the drive winding and is connected in a circuit connected in parallel with the power transformer; and the primary and secondary circuits being magnetically coupled and including power circuitry to operate as a forward converter.

14. A DC to DC power converter as claimed in claim 1, 2 or 3 comprising:

a second drive transformer is included for accepting the drive winding and is connected in a circuit connected in parallel with the power transformer; and the primary and secondary circuits being magnetically coupled and including power circuitry to operate as a flyback converter.

15. A DC to DC power converter as claimed in claim 1, 2 or 3 comprising:

a second drive transformer is included for accepting the drive winding and is connected in a circuit connected in parallel with the power transformer; and the power transformer includes a tapped secondary winding.

16. A DC to DC power converter as claimed in claim 1, 2 or 3 comprising:

the primary and secondary circuits being magnetically coupled, and further including circuitry to operate as a forward converter.

17. A DC to DC power converter as claimed in claim 1, 2 or 3 comprising:

the primary and secondary circuits being magnetically coupled, and including circuitry to operate as a flyback converter.

18. A DC to DC power converter as claimed in claim 1, 2 or 3 comprising:

the power transformer having a tapped secondary winding connected to the low pass output filter.

19. A DC to DC power converter as claimed in claim 1, 2 or 3 comprising:

the drive winding being wound on the power transformer.

20. A DC to DC power converter as claimed in claim 1, 2 or 3 comprising:

a second transformer including a primary winding connected in parallel with the power switch and the drive winding connected to drive the first and second [voltage-limit] *voltage limit* switches, and the drive winding exclusively electromagnetically coupled to the second transformer.

21. A DC to DC power converter as claimed in claim 1, 2 or 3 comprising:

a second transformer having a primary winding connected in parallel with the power switch and a drive winding connected to drive the first and second [voltage-limit] *voltage limit* switches.

22. A DC to DC power converter as claimed in claim 1, 2 or 3 comprising:

a second transformer having a primary winding connected in parallel with the primary winding of the power transformer and a drive winding connected to drive the first and second [voltage-limit] *voltage limit* switches.

23. A DC to DC power converter as claimed in claim 1, 2 or 3 comprising:

at least one of the rectifier switches being a diode.

24. A DC to DC power converter comprising:

a power transformer having a primary winding and a secondary winding;

a primary circuit for connecting an input DC voltage to the primary winding and including, a power switch and a clamping circuit for sustaining a voltage in the secondary winding during non-conduction of the power switch;

a secondary circuit for coupling energy transfer from the secondary winding to an output and including, a low pass output filter connected to the output and a synchronous rectifier connecting the secondary winding to the low pass output filter;

the secondary winding having a tap to define a drive portion of the secondary winding; and the synchronous rectifier including:

first and second synchronous rectifier switches each controlled by a signal applied to an included control electrode, first and second [voltage-limit] *positive and negative voltage limit* switch devices connected to limit a *positive and negative* voltage*, respectively,* of drive signals applied to the first and second synchronous rectifier switches and the drive portion of the secondary winding connected to periodically energize at least one of the first and second synchronous rectifier switches, and another one of the first and second synchronous rectifiers being connected to be energized by an output of the secondary winding.

25. A DC to DC power converter comprising:

a power transformer having a primary winding and a secondary winding;

a primary circuit for connecting an input DC voltage to the primary winding and including, a power switch and a clamping circuit for sustaining a voltage in the secondary winding during non-conduction of the power switch;

a secondary circuit for coupling energy transfer from the secondary winding to an output and including, a low pass output filter connected to the output and a synchronous rectifier connecting the secondary winding to the low pass output filter, the secondary winding having at least a first and second tap to define first and second drive portions of the secondary winding; and the synchronous rectifier including:

first and second synchronous rectifier switches, each controlled by a signal applied to an included control electrode, first and second *positive and negative* voltage limit switch devices connected to limit a *positive and negative* voltage*, respectively,* of drive signals applied to the first and second synchronous rectifier switches, and the first drive portion of the secondary winding connected to periodically energize the first synchronous rectifier and the second drive portion of the secondary winding connected to periodically energize the second synchronous rectifier.

26. A DC to DC power converter, comprising:

a power transformer having a primary winding and a secondary winding;

a primary circuit for connecting an input DC voltage to the primary winding and including, a power switch;

a secondary circuit for coupling energy transfer from the secondary winding to an output and including, a low pass output filter connected to the output and a synchronous rectifier connecting the secondary winding to the low pass output filter, and the synchronous rectifier including;

first and second synchronous rectifier switches each controlled by a signal applied to an included control electrode, first and second voltage limit switch devices connected to limit a voltage of drive signals applied to the first and second synchronous rectifier switches;

first and second diodes connected to limit a positive voltage applied to the gate electrodes of the first and second synchronous rectifier switches; and a *separate* drive winding connected to alternatively energize the first and second synchronous rectifier switches.

27. A DC to DC power converter comprising:

a power transformer having a primary winding and a secondary winding;

a primary circuit for connecting an input DC voltage to the primary winding and including, a power switch;

a secondary circuit for coupling energy transfer from the secondary winding to an output and including, a low pass output filter connected to the output and a synchronous rectifier connecting the secondary winding to the low pass output filter;

the secondary winding having a tap to define a drive portion of the secondary winding; and the synchronous rectifier including:

first and second synchronous rectifier switches each controlled by a signal applied to an included control electrode, first and second [voltage-limit] *positive and negative voltage limit* switch devices connected to limit a *positive and negative* voltage, *respectively,* of drive signals applied to the first and second synchronous rectifier switches and the drive portion of the secondary winding connected to periodically energize at least one of the first and second synchronous rectifier switches, and another one of the first and second synchronous rectifiers being connected to be energized by an output of the secondary winding.

28. A DC to DC power converter comprising:

a power transformer having a primary winding and a secondary winding;

a primary circuit for connecting an input DC voltage to the primary winding and including, a power switch;

a secondary circuit for coupling energy transfer from the secondary winding to an output and including, a low pass output filter connected to the output and a synchronous rectifier connecting the secondary winding to the low pass output filter, the secondary winding having at least a first and second tap to define first and second drive portions of the secondary winding; and the synchronous rectifier including:

first and second synchronous rectifier switches, each controlled by a signal applied to an included control electrode, first and second *positive and negative* voltage limit switch devices connected to limit a *positive and negative* voltage, *respectively,* of drive signals applied to the first and second synchronous rectifier switches, and the first drive portion of the secondary winding connected to periodically energize the first synchronous rectifier and the second drive portion of the secondary winding connected to periodically energize the second synchronous rectifier.

*29. A power converter having an input and output, comprising:*

*a power transformer having, primary and secondary windings;*

*a power switch coupled to the input and configured to impress an input voltage across the primary winding;*

*a synchronous rectifier coupled to the secondary winding and including first and second synchronous rectifier switches; and*

*a separate drive winding wound on the power transformer and coupled between the first and second synchronous rectifier switches, the separate drive winding configured to alternately energize the first and second synchronous rectifier switches.*

*30. The power converter as claimed in claim 29 further comprising a low pass filter coupled between the secondary winding and the output.*

*31. The power converter as claimed in claim 29 further comprising first and second voltage limit switches that limit a voltage level of a signal applied to the first and second synchronous rectifier switches, respectively.*

*32. The power converter as claimed in claim 29 further comprising a voltage source that supplies a bias voltage to first and second voltage limit switches coupled to the first and second synchronous rectifier switches, respectively.*

*33. The power converter as claimed in claim 29 further comprising a clamp circuit coupled to the power transformer.*

*34. The power converter as claimed in claim 29 wherein the secondary winding has a center tap.*

*35. The power converter as claimed in claim 29 wherein at least one of the first and second synchronous rectifier switches is a diode.*

*36. The power converter as claimed in claim 29 further comprising first and second diodes that limit a voltage of a signal applied to the first and second synchronous rectifier switches, respectively.*

*37. The power converter as claimed in claim 29 further comprising first and second voltage limit switches and a voltage source that limit a negative voltage of a signal applied to the first and second synchronous rectifier switches, respectively.*

*38. The power converter as claimed in claim 29 further comprising a regulation control circuit and a drive circuit coupled between the output and the power switch.*

*39. The power converter as claimed in claim 29 wherein the separate drive winding is directly coupled to the first and second synchronous rectifier switches.*

*40. The power converter as claimed in claim 29 wherein the power converter is selected from the up consisting of:*

*a forward power converter,*

*a flyback power converter,* a buck power converter, and

*a power converter with a tapped secondary winding.*

*41. A method of operating a power converter having an input output, comprising:*

*providing a power transformer having primary and secondary windings;*

*impressing an input voltage across the primary winding with a power switch coupled to the input;*

*alternately energizing first and second synchronous rectifier switches with a separate drive winding wound on the power transformer and coupled between the first and second synchronous rectifier switches.*

*42. The method as claimed in claim 41 further comprising filtering an output voltage of the power converter.*

*43. The method as claimed in claim 41 further comprising limiting a voltage level of a signal applied to the first and second synchronous rectifier switches.*

*44. The method as claimed in claim 41 further comprising supplying a bias voltage to first and second voltage limit switches coupled to the first and second synchronous rectifier switches respectively.*

*45. The method as claimed in claim 41 further comprising clamping a voltage level across the power transformer.*

*46. The method as claimed in claim 41 further comprising forming a center in the secondary winding.*

*47. The method as claimed in claim 41 wherein at least one of the first and second synchronous rectifier switches is a diode.*

*48. The method as claimed in claim 41 further comprising limiting a positive voltage of a signal applied to the first and second synchronous rectifier switches, respectively.*

*49. The method as claimed in claim 41 further comprising limiting a negative voltage of a signal applied to the first and second synchronous rectifier switches, respectively.*

*50. The method as claimed in claim 41 further comprising regulating an output voltage of the power converter.*

*51. The method as claimed in claim 41 wherein the separate drive winding is directly coupled to the first and second synchronous rectifier switches.*

*52. The method as claimed in claim 41 wherein the power converter is selected from the group consisting of:*

*a forward power converter,*

*a flyback power converter,*

*a buck power converter, and*

*a power converter with a tapped secondary winding.*

*53. A power converter having an input and output, comprising:*

*a power transformer having primary and secondary windings;*

*an auxiliary transformer coupled to the power transformer;*

*a power switch, coupled to the input that impresses an input voltage across the primary winding;*

*a synchronous rectifier coupled to the secondary winding and including first and second synchronous rectifier switches; and*

*a separate drive winding wound on the auxiliary transformer and coupled between the first and second synchronous rectifier switches, the separate drive winding configured to alternately energize the first and second synchronous rectifier switches.*

*54. The power converter as claimed in claim 53 further comprising a low pass filter coupled between the secondary winding and the output.*

*55. The power converter as claimed in claim 53 further comprising first and second voltage limit switches that limit a voltage level of a signal applied to the first and second synchronous rectifier switches, respectively.*

*56. The power converter as claimed in claim 53 further comprising a voltage source that supplies a bias voltage to first and second voltage limit switches coupled to the first and second synchronous rectifier switches, respectively.*

*57. The power converter as claimed in claim 53 further comprising a clamp circuit coupled to the power transformer.*

*58. The power converter as claimed in claim 53 wherein the secondary winding has a center tap.*

*59. The power converter as claimed in claim 53 wherein at least one of the first and second synchronous rectifier switches is a diode.*

*60. The power converter as claimed in claim 53 further comprising first and second diodes that limit a voltage of a signal applied to the first and second synchronous rectifier switches, respectively.*

*61. The power converter as claimed in claim 53 further comprising first and second voltage limit switches and a voltage source that limit a negative voltage of a signal applied to the first and second synchronous rectifier switches, respectively.*

*62. The power converter as claimed in claim 53 further comprising a regulation control circuit and a drive circuit coupled between the output and the power switch.*

*63. The power converter as claimed in claim 53 wherein the separate drive winding is directly coupled to the first and second synchronous rectifier switches.*

*64. The power converter as claimed in claim 53 wherein the power converter is selected from the a group consisting of:*

*a forward power converter,*

*a flyback power converter,*

*a buck power converter, and*

*a power converter with a tapped secondary winding.*

*65. A method of operating a power converter having an input and output, comprising:*

*providing a power transformer having primary and secondary winding;*

*coupling an auxiliary transformer to the power transformer;*

*impressing an input voltage across the primary winding with a power switch coupled to the input;*

*alternately energizing first and second synchronous rectifier switches with a separate drive winding wound on the auxiliary transformer and coupled between the first and second synchronous rectifier switches.*

*66. The method as claimed in claim 65 further comprising filtering an output voltage of the power converter.*

*67. The method as claimed in claim 65 further comprising limiting a voltage level of a signal applied to the first and second synchronous rectifier switches.*

*68. The method as claimed in claim 65 further comprising supplying a bias voltage to first and second voltage limit switches coupled to the first and second synchronous rectifier switches, respectively.*

*69. The method as claimed in claim 65 further comprising clamping a voltage level across the power transformer.*

*70. The method as claimed in claim 65 further comprising forming a center tap in the secondary winding.*

*71. The method as claimed in claim 65 wherein at least one of the first and second synchronous rectifier switches is a diode.*

*72. The method as claimed in claim 65 further comprising limiting a positive voltage of a signal applied to the first and second synchronous rectifier switches, respectively.*

*73. The method as claimed in claim 65 further comprising limiting a negative voltage of a signal applied to the first and second synchronous rectifier switches, respectively.*

*74. The method as claimed in claim 65 further comprising regulating an output voltage of the power converter.*

*75. The method as claimed in claim 65 wherein the separate drive winding is directly coupled to the first and second synchronous rectifier switches.*

*76. The method as claimed in claim 65 wherein the power converter is selected from the group consisting of:*

*a forward power converter,*

*a flyback power converter,*

*a buck power converter, and*

*a power converter with a tapped secondary winding.*

* * * * *